United States Patent
Stanley

(10) Patent No.: US 9,286,022 B2
(45) Date of Patent: Mar. 15, 2016

(54) PROCESSING OF DISPLAY DATA IN A DISPLAY SYSTEM

(71) Applicant: DisplayLink (UK) Limited, Cambridge (GB)

(72) Inventor: Jon Stanley, Cambridge (GB)

(73) Assignee: DisplayLink (UK) Limited (GB)

( * ) Notice: Subject to any disclaimer, the term of this patent is extended or adjusted under 35 U.S.C. 154(b) by 276 days.

(21) Appl. No.: 13/795,368

(22) Filed: Mar. 12, 2013

(65) Prior Publication Data

US 2014/0267326 A1    Sep. 18, 2014

(51) Int. Cl.
G06T 1/00 (2006.01)
G06T 15/00 (2011.01)
G06F 3/14 (2006.01)

(52) U.S. Cl.
CPC ............... *G06F 3/14* (2013.01); *G06F 3/1454* (2013.01); *G09G 2330/021* (2013.01); *G09G 2340/02* (2013.01); *G09G 2360/08* (2013.01); *G09G 2370/022* (2013.01); *G09G 2370/04* (2013.01)

(58) Field of Classification Search
CPC ........... G06T 1/20; G06T 15/005; G06T 3/14; G09G 5/363; G09G 2330/021; G06F 3/1454
See application file for complete search history.

(56) References Cited

U.S. PATENT DOCUMENTS

| | | | |
|---|---|---|---|
| 6,839,790 B2* | 1/2005 | Barros De Almeida et al. | 710/305 |
| 7,587,520 B1* | 9/2009 | Kent et al. | 709/247 |
| 2007/0152993 A1 | 7/2007 | Mesmer et al. | |
| 2010/0289803 A1* | 11/2010 | Klosowski et al. | 345/502 |

FOREIGN PATENT DOCUMENTS

JP    2009017080 A    1/2009

OTHER PUBLICATIONS

B. Paul, S. Ahern, E. W. Bethel, E. Brugger, R. Cook, J. Daniel, K. Lewis, J. Owen, and D. Southard. Chromium Renderserver: Scalable and Open Remote Rendering Infrastructure. IEEE Transactions on Visualization and Computer Graphics, 14(3), May 2008. LBNL-627-639.*

F. Lamberti, A. Sanna Streaming-based solution for remote visualization of 3D graphics on mobile devices IEEE Trans. Visual. Comput. Graph., 13 (2) (2007), pp. 247-260.*

British Search Report for Application No. GB1021036.7 dated Apr. 13, 2011.

* cited by examiner

*Primary Examiner* — Jacinta M Crawford
*Assistant Examiner* — Robert Craddock
(74) *Attorney, Agent, or Firm* — Lerner, David, Littenberg, Krumholz & Mentlik, LLP

(57) ABSTRACT

In a method of processing display data, a host device (e.g. a PC) determines display data to send to a remote device and compresses it, and determines processing resources required at the remote device to decompress the compressed display data. The host sends the compressed display data and control information regarding the required processing resources data to the remote device, and the remote device adjusts its processing resources based on the control information, saving energy. The required processing resources can be the number of processing units, clock speed, or operating voltage required by the remote device. The host may determine the required resources for each display frame. The remote device may send details of its processing capabilities to the host.

26 Claims, 5 Drawing Sheets

PROCESSING OF DISPLAY DATA IN A DISPLAY SYSTEM

CROSS REFERENCE TO RELATED APPLICATIONS

This invention relates to processing of display data in a display system comprising a host computing device and a remote device connected to a display.

BACKGROUND OF THE INVENTION

In desktop computing, it is possible to connect a computing device to more than one display device. Traditionally, a user would have a computer with a single display device attached, but now it is possible to have more than one display device attached to the computer, which increases the usable display area for the worker.

The connection of an additional display device to a computer presents a number of problems. In general, a computer will be provided with only one video output, such as a VGA-out connection. One method by which a second display device can be added to a computer is by adding an additional graphics card to the internal components of the computer. The additional graphics card will provide an additional video output which will allow the second display device to be connected to the computer and driven by that computer. However, this solution is relatively expensive and is not suitable for many non-technical users of computers.

International Patent Application Publication WO 2005/083558 describes an alternative type of display system. A host computing device (e.g. desktop computer) is coupled to displays using a general-purpose network, such as Universal Serial Bus (USB) or Ethernet. A remote device, local to the display, acts as a network-to-video converter. The remote device has a network interface for receiving display data over the general-purpose network, storing the data in a frame buffer, and outputting the data on a video interface to the display. To minimise the amount of bandwidth used on the general-purpose network, the display data is sent in compressed form and decompressed locally at the remote device. It is also desirable that any additional hardware between the computer and the display device is kept as simple as possible. It is also desirable that the remote device is powered by the host computing device. Higher definition video content and higher resolution display devices demand higher processing at the remote device, and make it increasingly challenging to produce a high performance display control device which can be powered by the host computing device.

It is therefore an object of the invention to improve upon the prior art.

BRIEF SUMMARY OF THE INVENTION

A first aspect of the present invention provides a method of operating a host computing device which is connectable to a remote device for processing display data for a display. The method comprises determining display data for sending to the remote device and determining processing resources required at the remote device to decompress a compressed form of the display data. The method further comprises sending control information to the remote device about the processing resources required to process the display data and sending the display data to the remote device. The method further comprises receiving feedback from the remote device about performance of the processing of the display data at the remote device and using the feedback to adjust a future step of determining processing resources required at the remote device In some embodiments, the method comprises compressing the display data to generate compressed display data prior to the compressed display data being sent to the remote device. Determining processing resources required at the remote device to process the display data may comprise determining processing resources required at the remote device to decompress the compressed display data. The control information may comprise information about the processing resources required to decompress the compressed display data.

The remote device can operate in a state in which it uses an amount of processing resources matched to the processing demands of the display data it receives. This allows the remote device to draw as little power as is required to complete the required processing functions and reduces excess power dissipation to a minimum. This is in contrast to a conventional device that has a higher consistent power consumption, with an amount of processing resources to cope with worst case demands. When averaged, the power used by the above described function is lower than a system without such adjustment, with no necessary loss in performance. Minimising the power consumption of the remote device allows the possibility of powering the remote device by the host computing device via power supply lines of a communication network interface, such as USB. This avoids the need to provide a dedicated power supply local to the remote device.

One or more factors at the remote device can be changed to vary processing resources at the remote device, such as: a number of processing units; a clock rate of the remote device; an operating voltage of the remote device.

Advantageously, the step of generating display data comprises determining differences between two frames of display data. This reduces the amount of data that is sent to the remote device. A consequence of only sending differences between frames is that the amount of data sent can vary quite considerably on a frame-to-frame basis, thereby varying the processing resources required at the remote device.

Advantageously, the method is performed repeatedly, such as once for each new frame of display data. The method can be performed more frequently, or less frequently.

Steps of the method can be performed in a different order with the same, or similar, results. For example, the step of compressing the display data to form compressed display data can be performed before the step of determining processing resources required at the remote device to decompress a compressed form of the display data.

Another aspect of the present invention provides a method of operating a remote device for processing display data, the remote device being connectable to a host computing device and to a display, the method comprising: receiving control information from the host computing device about processing resources required at the remote device to process an amount of display data; receiving the display data; adjusting processing resources at the remote device based on the received control information; processing the display data to form displayable display data; outputting the displayable display data to the display; monitoring performance of the processing of the display data; and sending feedback to the host computing device about the processing performance.

The display data may be accompanied by other data, such as audio data.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions.

Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
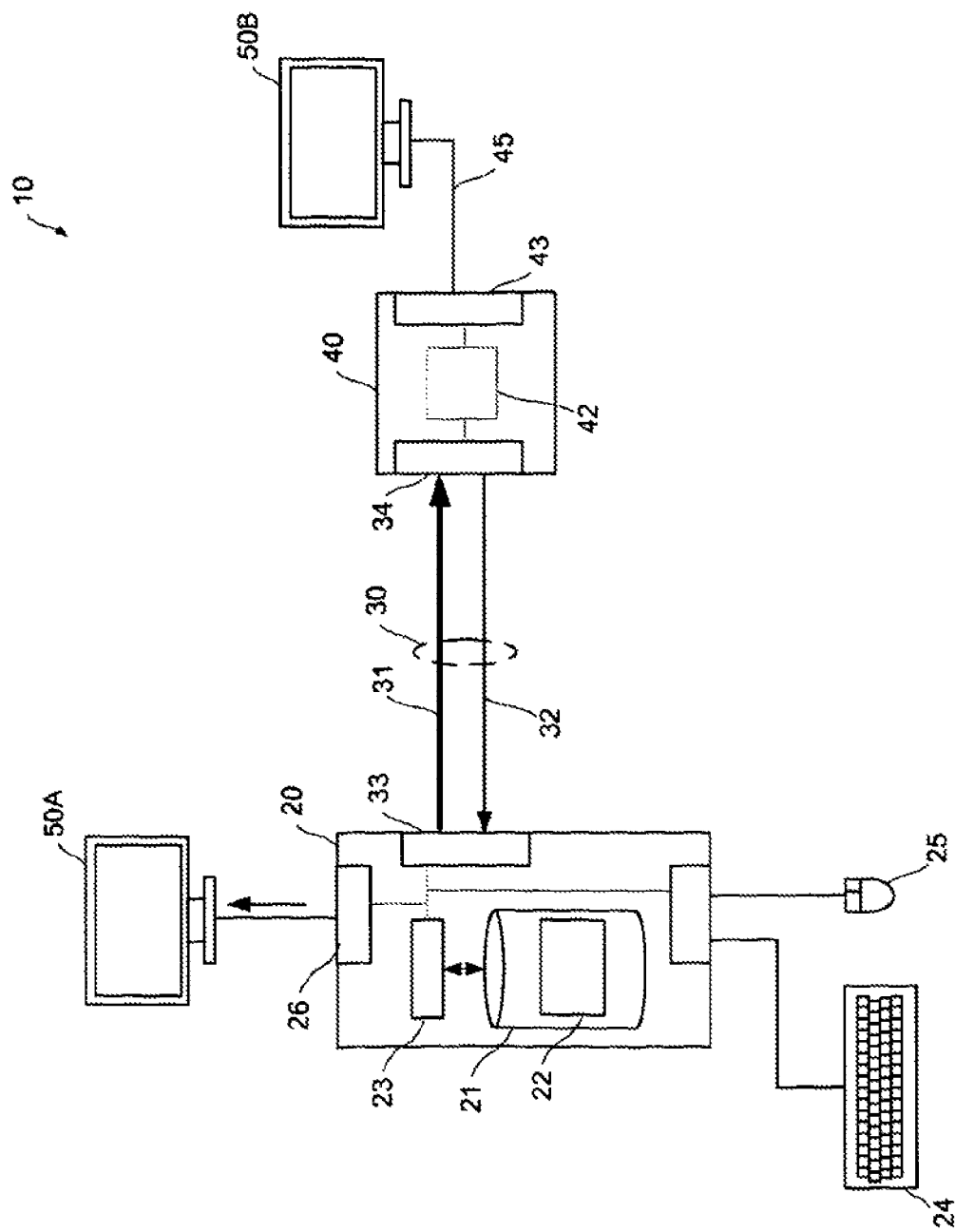
FIG. 1 shows a first embodiment of a display system with a host computing device connected to a display via a general purpose interface or network.

FIG. 1 shows a first type of display system 10 in accordance with an embodiment of the invention. The system comprises a host processing device 20 and two display devices 50A, 50B. The system shown in FIG. 1 can be a standard desktop computer, a laptop computer or suitably enabled handheld device such as a mobile phone or PDA (Personal Digital Assistant). In a typical manner, the host computing device has a processor 23, storage 21, and a user interface, such as a keyboard 24 and a mouse 25.

In FIG. 1, first display 50A is connected to the host computing device 20 in a conventional manner, via a graphics card 26. Second display 50B is connected to the host computing device 20 via a general-purpose interface 30, such as Universal Serial Bus (USB). A remote device 40, which will be called a display control device 40, connects between the general-purpose interface 30 and second display device 50B. The display control device 40 appears, to the host computing device 20, as a USB connected device. Any communications between the host computing device 20 and the display control device 40 are carried out under the control of a USB driver specifically for the display control device 40. Such devices allow the connection of the second display device 50B to the processing device 10 without the need for any hardware changes to the host computing device 20. The display control device 40 connects to the display device 50B via a standard video interface 45, such as VGA or Digital Visual Interface (DVI). Display control device 40 includes processing apparatus 42 which is configured to receive display data over the general-purpose interface 30 and then output the data in a form suitable for the display device 50B. The display data is sent over the general-purpose interface 30 in compressed form and decompressed locally at the display control device 40. Advantageously, the display control device 40 is powered by the host computing device 20 via power supply lines of the interface 30.

The display device 50B is a conventional display device which requires no adjustment to operate in the display system shown in FIG. 1. As far as the display device 50B is concerned, it could be connected directly to the graphics card of a host computing device and it is unaware that the display data has actually been sent firstly via a USB connection to an intermediate component. Multiple additional display devices 50B can be connected to the host computing device 20 in this way, as long as suitable USB ports are available on the host computing device 20. The display control device 40 is external to the host computing device 20 and is not a graphics card. It is a dedicated piece of hardware that receives graphical data via the USB connection from the host computing device 20 and transforms that graphics data into a format that will be understood by the display device 50B. It will be understood that any general-purpose data network (e.g. Ethernet) can connect the host computing device 20 to the display control device 40 and any display specific interface is used on the connection from the display control device 40 to the display device 50B.

Figure 2:
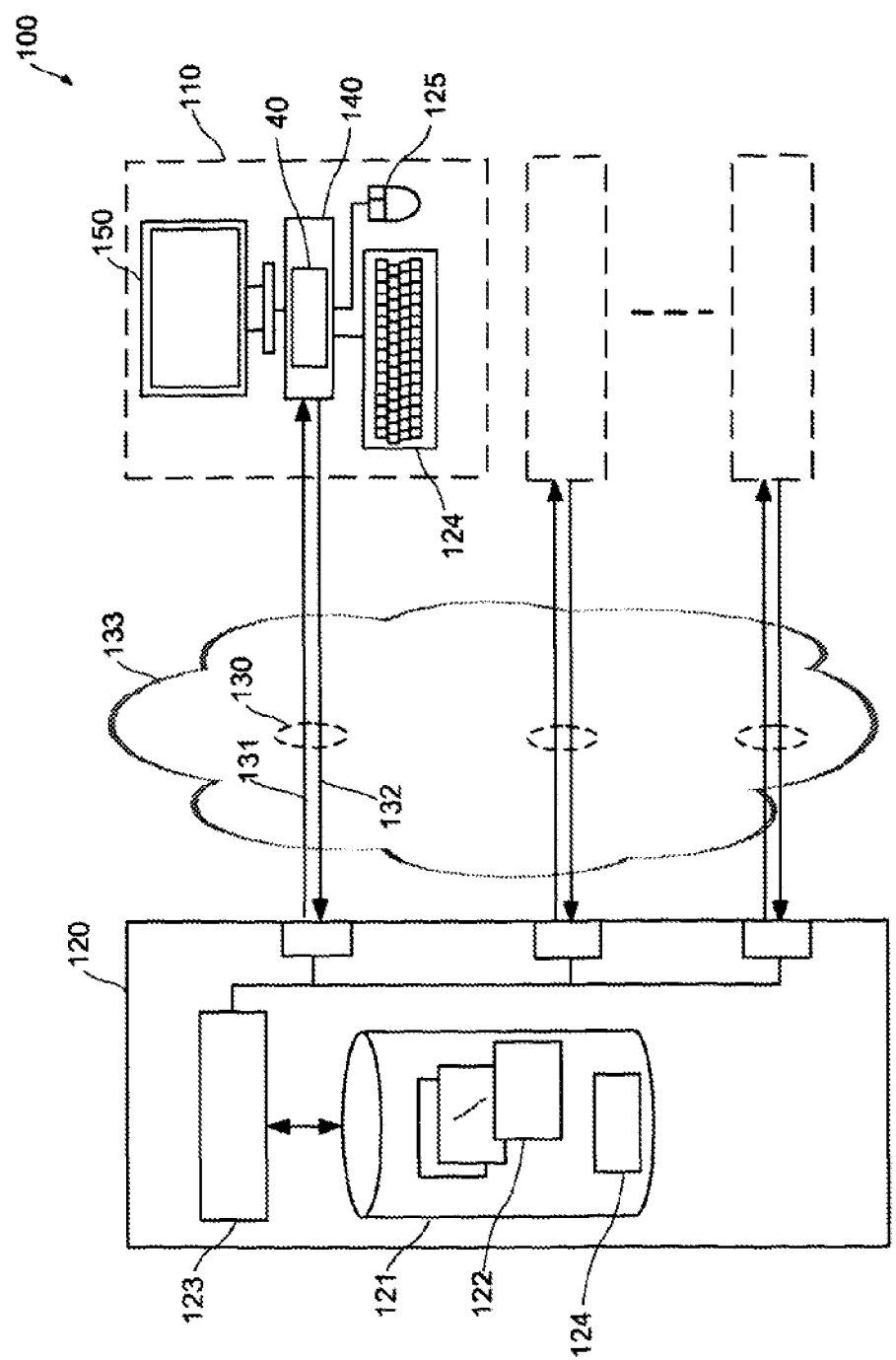
FIG. 2 shows a second embodiment of a display system with a server type of connected to a plurality of client computing devices via a general-purpose network.

FIG. 2 shows a second type of display system 100 in accordance with an embodiment of the invention. A server 120 connects to multiple client devices 110 by a data pipe 130 over a general purpose data network 133, such as an Ethernet network. Advantageously, the client devices 110 are thin, ultra-thin or zero client devices. These types of client device have relatively limited processing power. Functionality that would typically be performed by a "fat" or even a normal "thin" client device is performed by the server 120. This type of architecture has the advantages of reliably and securely storing data at the server 120, avoiding the need to install and regularly upgrade software on multiple client devices 110, and requiring low-cost client devices 110. Server 120 maintains an instance of a virtual machine for each connected client device 110. Server 120 performs all of the operating system and application layer processing that would typically be performed at a client device, and generates display data 122 representing the desktop display to be displayed at the client device 110. The client devices 110 are only required to receive the display data from the server 120, display the display data, and return user inputs to the server. Each client device 110 has a terminal unit 140, a display 150 and a user interface, such as a keyboard 124 and mouse 125. Terminal 140 includes the same functionality as the display control device 40 of FIG. 1. Terminal 140 receives display data via a forward path 131 over the general purpose network 133 and converts the display data into a form suitable for output to display 150. The display data is sent over the general-purpose network 133 in compressed form and decompressed locally at the terminal 140. User inputs from the user interface 124, 125, and any control data, are returned to the server via a reverse path 132 over the general purpose network 133.

Display data is sent at regular intervals. As display control device 40 is required to output data on video interface 45 at a frame refresh rate, it is convenient to send new display data to the display control device 40 at the same rate. It is possible to send a full frame of display data on each occasion. However, it is advantageous to send only differences between frames on each occasion. This reduces the amount of data sent over the general purpose interface 30. Data can be sent used an address-based protocol described in WO 2006/061582. A consequence of only sending differences between frames is that the amount of data sent can vary quite considerably on a frame-to-frame basis.

Figure 3:
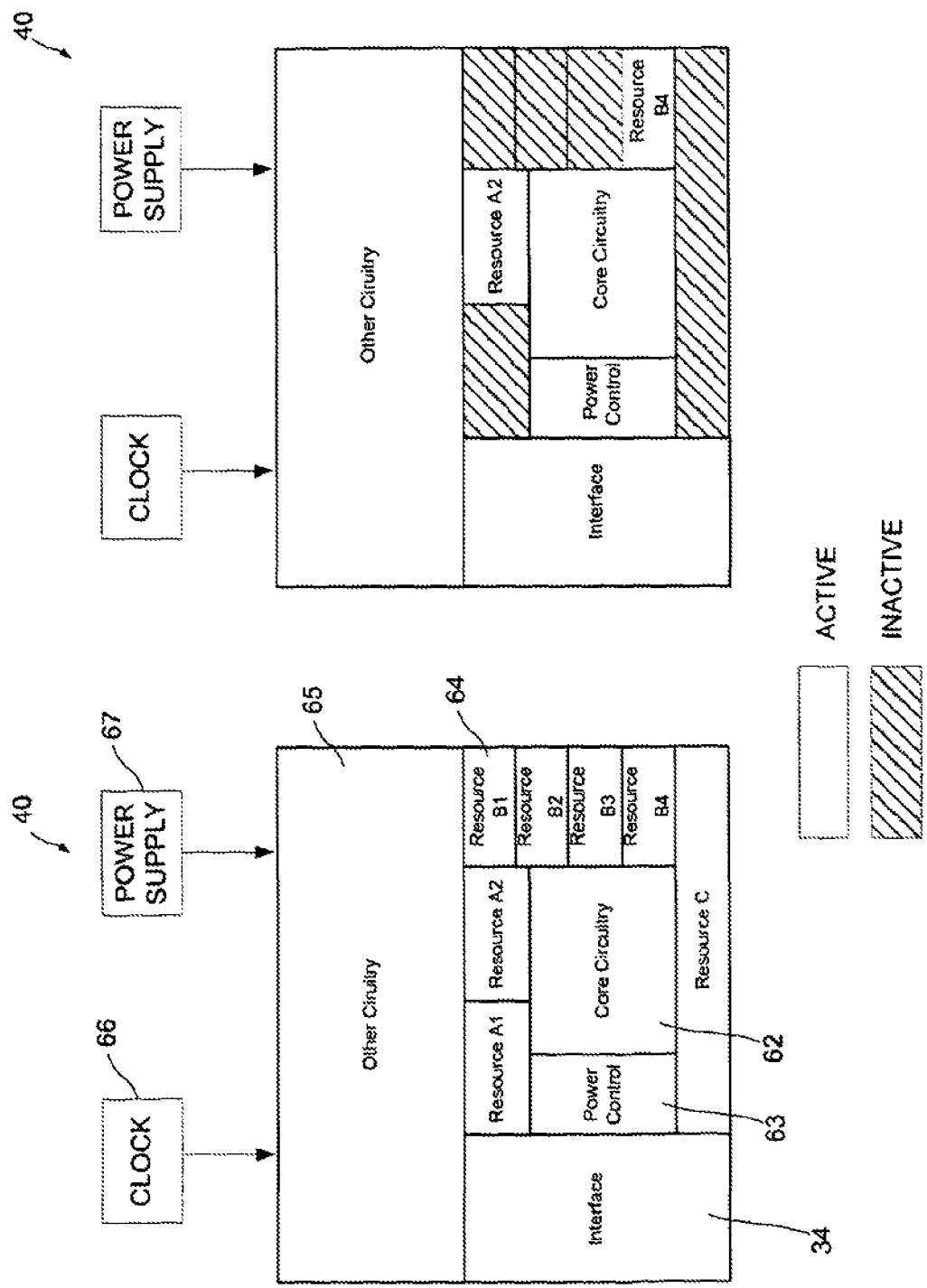
FIGS. 3A and 3B shows a remote device in the display systems of FIGS. 1 and 2.

FIG. 3 shows more detail of the display control device 40. The display control device 22 comprises a network interface 34, core circuitry 62, a plurality of resource units 64 and other circuitry 65. Circuitry 65 can include a video controller for outputting a video signal and a frame buffer store for storing display data. The display control device 40 receives compressed video from the general-purpose network via the network interface 34, decompresses the display data into pixel data and stores the decompressed data in a frame buffer. The video controller performs a physical refresh of the display device by reading pixel data from the frame buffer. Resource units 64, which can also be called processing engines, can perform functions such as decompression of display data. Decompression is a computationally-intensive process and is best performed by dedicated hardware 64. The resource units 64 can be individually activated or deactivated, as required. In accordance with one embodiment of the invention, power control unit 63 controls the number of processing resource units 64 used by the display control device 40 at any time. FIG. 3A shows a first operating state in which all of the resources 64 are activated. FIG. 38 shows a second operating state in which some of the resources 64 have been activated. In the state shown in FIG. 38, the power consumption of the display control device 40 is reduced compared to the state shown in FIG. 3A.

Display control device 40 has a clock 66 which supplies a clock signal to the modules of the device 40. The rate of the clock signal determines the operating speed of the device 40 and the rate at which the device 40 can process display data. In accordance with one embodiment of the invention, the clock 66 is operable at a range of different clock rates and the power control unit 63 controls the clock rate used by the display control device 40 at any time. The power consumption of the display control device 40 varies according to the clock rate, with a lower power consumption at lower clock rates.

Display control device 40 has a power supply 67 which supplies an operating voltage to the modules of the device 40. The operating voltage can be a bias voltage of the die substrate of the semiconductor circuitry. The operating voltage determines the operating speed of the device 40 and the rate at which the device 40 can process display data. In accordance with one embodiment of the invention, the power supply 67 is operable at a range of different operating voltages and the power control unit 63 controls the operating voltage used by the display control device 40 at any time. The power consumption of the display control device 40 varies according to the operating voltage, with a lower power consumption at lower operating voltages.

One or more of the quantities described above: (i) number of processing resource units; (ii) clock rate; (iii) operating voltage, can be varied at any given time. Advantageously, the power control unit 63 varies one or more of the quantities to ensure that the display control device 40 has sufficient processing resources to decompress the display data that the host computing device is about to send. In this way, the display control device 40 only consumes as much power as it needs to.

Figure 4:
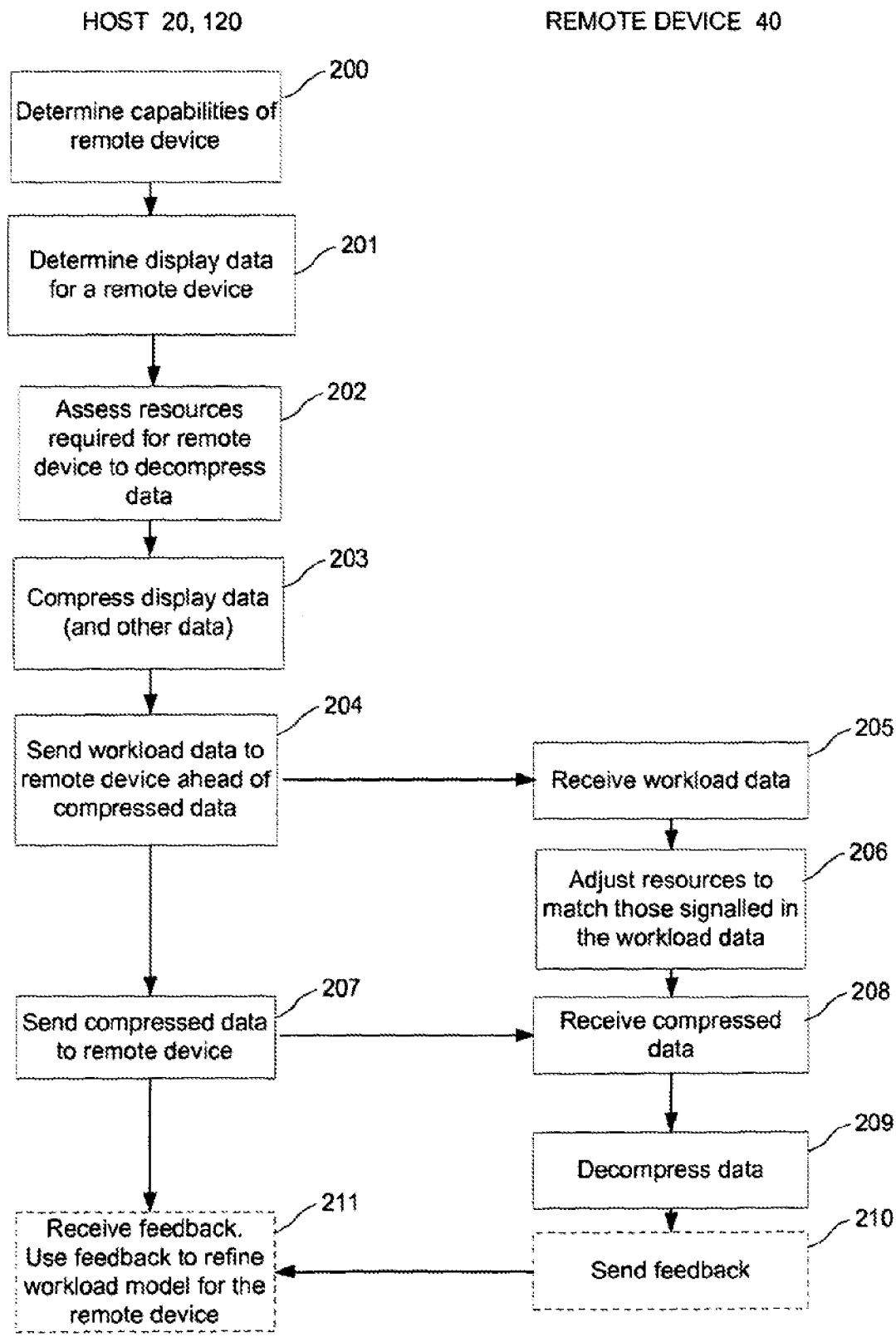
FIG. 4 shows a method performed at a host computing device and a remote device.

FIG. 4 shows an overview of the method performed by the host computing device 20, 120 and the remote device/display control device 40. Steps at the host computing device are performed by a processor 23, 123 and steps at the remote device are performed by the power control unit 63.

In an optional first step 200 of the method, the host computing device determines the capabilities of the remote device 40. The host can determine the capabilities in a variety of ways, such as by a signalling exchange with the remote device 40 or by retrieving information about the remote device 40 which it stored locally 21, 121, and has been obtained from previous exchanges with the remote device 40.

At step 201 the host computing device determines display data which is to be sent to the remote device, such as a frame of display data representing a desktop display. Advantageously, the method operates in terms of workload units of data. The unit can be any convenient unit of workload, such as a cell, a tile, a frame or a number of frames. Step 201 can determine display data by determining differences between two frames of display data, such as two sequential frames. In this case, the differences between frames comprise the display data which will be compressed and sent to the remote device 40.

At step 202 the host computing device assesses the amount of processing resources that are likely to be required at the remote device 40 to decompress the unit of compressed display data.

At step 203 the host computing device compresses a unit of display data. Other data may also be compressed, such as audio data and/or control data. The compression scheme can be a lossless compression scheme or a lossy compression scheme.

At step 204, the host computing device sends a control message to the remote device 40 carrying control information which indicates an amount of processing resources needed to decompress the display data. In the following description this indication of the required resources will be called "workload data". This message is received by the remote device 40 at step 205. There are various ways in which the host computing device can indicate the amount of processing resources that are required by the remote device 40. The workload data can use a scale of values, e.g. ranging from 0 to 100, where 0 represents no resources and 100 represents maximum resources. If the host computing device determined the capabilities of the remote device 40 at step 201, the scale of values is based on the known capabilities of the remote device 40, i.e. the value signalled to the remote device indicates the required processing resources as a proportion (percentage) of the known capabilities of the remote device. The workload data can specifically instruct the remote device to make particular changes, such as to turn off a number of processing engines 64, to vary the clock rate, or to vary the operating voltage. The clock rate and/or operating voltage can have a range of predetermined values (e.g. 1.0 GHz, 1.5 GHz, 2.0 GHz) and the workload data can instruct the remote device to step the clock rate or operating voltage up/down to the next predetermined value. Alternatively, the workload data can instruct the remote device to adjust the clock rate or operating voltage to a particular value specified in the workload data message. The host computing device can store information about the current resources of the remote device so that it can determine what change is required to the current resources for the next workload unit.

At step 206 the remote device adjusts the processing resources to match those signalled in the workload data. If the workload data specifies a scale value, power control unit 63 of the remote device 40 selects a number of processing resources units to meet that demand. The adjustment is made after completing processing of the previous workload unit, and before processing the new workload unit to which the workload data relates. The compressed data is sent by the host computing device at step 207 and received by the remote device 40 at step 208. At step 209 the remote device decompresses the display data using the processing resources set at step 206. Optionally, at step 210, the remote device 40 can send feedback information to the host computing device.

The feedback is received at step 211 by the host computing device and used to refine a workload model for the remote device. This should allow the host computing device to make a better prediction of the workload data on a future iteration. The remote device 40 monitors if it was able to process a workload unit in the required time using the resources signalled by the host computing device. On some occasions the amount of required resources to process a workload unit, signalled by the host computing device in the workload data, may be too low, causing the remote device to take longer than expected to decompress the data. This may occur, for example, due to other activities invisible to the host computing device. On other occasions the amount of required resources to process a workload unit, signalled by the host computing device in the workload data, may be too high, causing the remote device to take less time than expected to decompress the data. This has a disadvantage that the remote device uses more power than necessary.

As an alternative to sending feedback, the remote device 40 can calculate, and store, a scale factor between the host computing device's estimate of the resources required at the remote device and the actual resources needed. This scale function can be applied by the remote device 40 to the incoming workload data received from the host computing device at step 205.

At times when the processing resources of the remote device 40 are required by other functions, and the resources available to process display data are reduced, the host computing device can decide to reduce the frame rate or other quality metric to allow the remote device to complete tasks required with reduced power until any temporary power consuming functions are completed by the remote device. The host computing device can restore the frame rate upon completion of the other tasks. Advantageously, the remote device 40 signals to the host computing device when the frame rate can be restored.

Although the method shown in FIG. 4, shows a particular order of events, it will be understood that certain events can be performed in a different order with the same, or similar, results. For example, the order of steps 202 and 203 can be reversed. If the workload can be calculated before compression, as shown in FIG. 4, then that information can be sent followed by the compressed video data as it is being compressed by the host. If steps 202 and 203 occur the other way around, then the host stores the compressed data to which the workload function pertains before the workload information can be sent as the remote device needs the workload data before the compressed data.

Workload data is embedded in the transport stream to the host device, such as in the form of control messages, and is delivered to the remote device sufficiently far ahead of the arrival of compressed display data to which it applies so as to allow the remote device to make the necessary adjustments.

Figure 5:
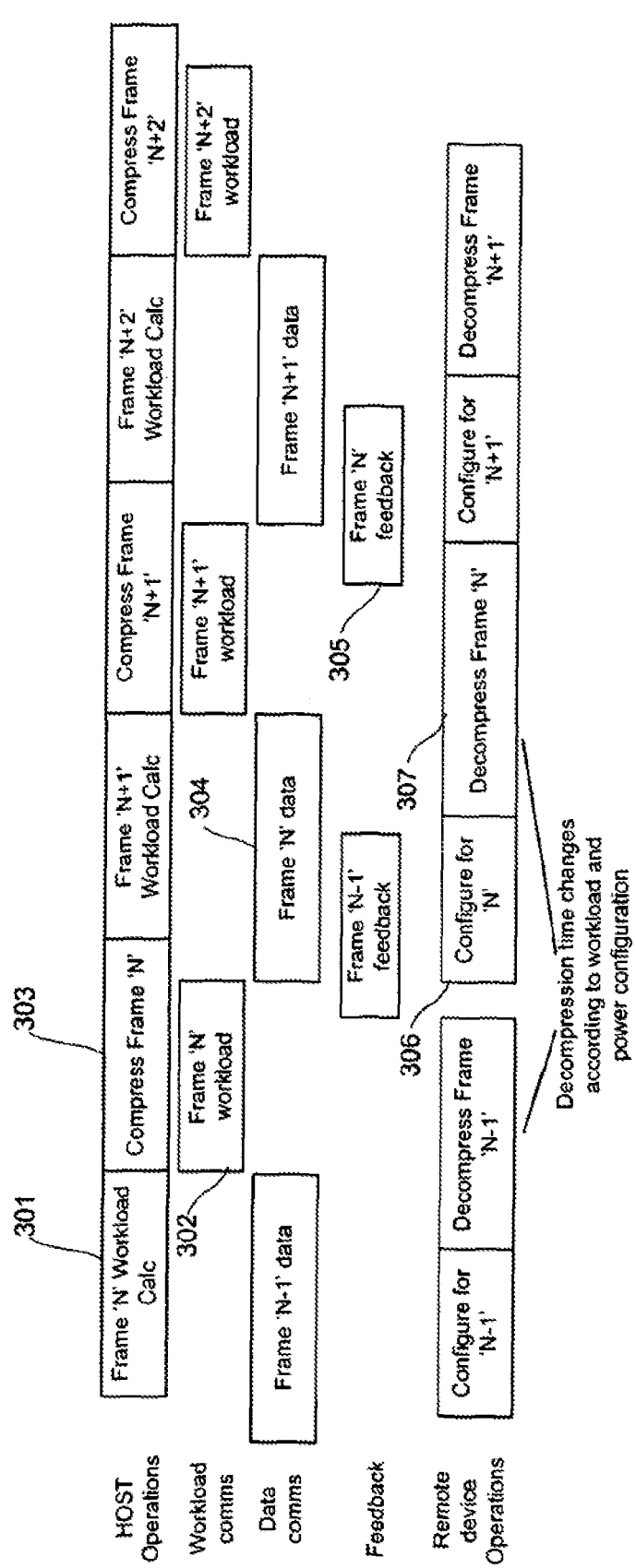
FIG. 5 shows a time line of processing operations at the host computing device and the remote device.

FIG. 5 shows a time line of processing operations at the host computing device 20, 120 and the remote device 40 corresponding to the method of FIG. 4. The host computing device calculates 301 workload data for a unit (frame 'N') of display data and sends 302 the workload data to the remote device. The host computing device compresses 303 the unit of display data and sends 304 the compressed unit of display data to the remote device. The remote device sends feedback 305 about the unit. The remote device configures the device to process the unit of compressed data and then decompresses the unit of display data.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a host computing device which is connectable to a remote device via a communication network interface for processing display data for display, the method comprising:
   determining display data for sending to the remote device for display;
   determining processing resources to be used by the remote device to process the display data;
   preparing the display data to be processed by the remote device using the determined processing resources;
   sending control information to the remote device instructing the remote device as to the processing resources to be used to process the prepared display data for display;
   sending the prepared display data to the remote device before, with or after the control information;
   receiving feedback from the remote device regarding performance of the processing resources used for the processing of the prepared display data at the remote device; and
   repeating the determining processing resources, preparing the display data, sending the control information and sending the prepared display data based on the received feedback.

2. A method according to claim 1, wherein preparing the display data comprises compressing the display data to generate compressed display data, and wherein determining processing resources required at the remote device to process the display data comprises determining processing resources required at the remote device to decompress the compressed display data, and the control information comprises information instructing the remote device as to the processing resources to be used to decompress the compressed display data.

3. A method according to claim 1, further comprising initially determining processing capabilities of the remote device.

4. A method according to claim 3, wherein the control information indicates the processing resources to be used as a proportion of the determined capabilities of the remote device.

5. A method according to claim 3, wherein the control information indicates a change to the processing resources currently used at the remote device.

6. A method according to claim 1, wherein the remote device has a plurality of processing units and wherein determining processing resources determines a number of the processing units to be used to process the display data and the control information comprises instructions for the remote device of the number of processing units to be used, or a change compared to a number of processing units currently being used.

7. A method according to claim 1, wherein the remote device is operable at a range of clock rates and wherein determining processing resources determines a clock rate to be used to process the display data and the control information comprises instructions for the remote device of the clock rate to be used, or a change to a clock rate currently being used.

8. A method according to claim 1, wherein the communication network interface comprises a Universal Serial Bus (USB) interface.

9. A method according to claim 1, wherein the display data comprises differences between two frames of display data.

10. A method according to claim 1, wherein the remote device is powered, when connected, from the host computing device via the communication network interface.

11. A method of operating a host computing device which is connectable to a remote device via a communication network interface for processing display data for display, the method comprising:
   determining display data for sending to the remote device for display;
   determining processing resources to be used by the remote device to process the display data;
   preparing the display data to be processed by the remote device using the determined processing resources;
   sending control information to the remote device instructing the remote device as to the processing resources to be used to process the prepared display data for display;
   sending the prepared display data to the remote device before, with or after the control information;
   receiving feedback from the remote device regarding performance of the processing resources used for the processing of the prepared display data at the remote device; and
   repeating determining processing resources, preparing the display data, sending the control information and sending the prepared display data based on the received feedback,
   wherein the remote device is operable at a range of voltages and the step of determining processing resources determines an operating voltage to be used to process the display data and the control information comprises instructions for the remote device of an operating voltage to be used, or a change to an operating voltage currently being used.

12. A method of operating a remote device for processing display data, the remote device being connectable to a host computing device via a communication network interface for displaying display data, the method comprising:
   receiving control information from the host computing device instructing the remote device as to processing resources to be used at the remote device to process the display data;
   receiving the display data before, with or after the control information;
   setting the processing resources at the remote device according to the received control information;
   processing the display data using the set processing resources to form displayable display data;
   forwarding the displayable display data for display;
   monitoring performance of the processing resources during processing of the display data; and
   sending feedback to the host computing device about regarding the processing performance.

13. A method according to claim 12, wherein the received display data is compressed, and processing the display data comprises decompressing the display data to form decompressed displayable data.

14. A method according to claim 12, further comprising initially sending information about the processing capabilities of the remote device to the host computing device.

15. A method according to claim 14, wherein the control information indicates the processing resources to be used as a proportion of the processing capabilities.

16. A method according to claim 14, wherein the control information indicates a change to the processing resources currently used at the remote is device.

17. A method according to claim 12, wherein the remote device has a plurality of processing units and wherein the received control information specifies a number of processing units to be used, or a change compared to a number of processing units currently being used.

18. A method according to claim 12, wherein the remote device is operable at a range of clock rates and wherein the received control information specifies a clock rate to be used, or a change to a clock rate currently being used.

19. A method according to claim 12, wherein the communication network interface comprises a Universal Serial Bus (USB) interface.

20. A method according to claim 12,
   wherein setting processing resources at the remote device also uses information from the monitoring of the performance of the processing resources during processing of the display data to adjust the setting of processing resources.

21. A method according to claim 12, wherein the remote device is powered, when connected, from the host computing device via the communication network interface.

22. A method of operating a remote device for processing display data, the remote device being connectable to a host computing device via a communication network interface for displaying display data, the method comprising:
   receiving control information from the host computing device instructing the remote device as to processing resources to be used at the remote device to process the display data;
   receiving the display data before, with or after the control information;
   setting the processing resources at the remote device according to the received control information;
   processing the display data using the set processing resources to form displayable display data;
   forwarding the displayable display data for display;
   monitoring performance of the processing resources during processing of the display data; and
   sending feedback to the host computing device regarding the processing performance,
   wherein the remote device is operable at a range of voltages and the control information specifies an operating voltage to be used, or a change to an operating voltage currently being used.

23. A host computing device which is connectable to a remote device via a communication network interface for processing display data for display, the remote device being powered, when connected, from the host computing device via the communication network interface, the host computing device comprising a processor which is arranged to:
   determine display data for sending to the remote device for display;
   determine processing resources to be used by the remote device to process the display data;
   prepare the display data to be processed by the remote device using the determined processing resources;
   send control information to the remote device instructing the remote device as to the processing resources to be used to process the prepared display data for display;
   send the prepared display data to the remote device before, with or after the control information;
   receive feedback from the remote device regarding performance of the processing resources used for the processing of the prepared display data at the remote device; and repeat the determine processing resources, prepare the display data, send the control information and send the prepared display data based on the feedback.

24. A remote device for processing display data, the remote device being connectable to a host computing device via a communication network interface for displaying the display data, the remote device being powered, when connected, from the host computing device via the communication network interface, the remote device comprising a processor which is arranged to:

receive control information from the host computing device instructing the remote device as to processing resources to be used at the remote device to process the display data;

receive the display data before, with or after the control information;

set the processing resources at the remote device according to the received control information;

process the display data using the set processing resources to form displayable display data;

forwarding the displayable display data for display;

monitor performance of the processing resources during processing of the display data; and, send feedback to the host computing device regarding the processing performance.

25. A non-transitory tangible computer-readable medium carrying machine-readable instructions which, when executed by a processor at a host computing device which is connectable to a remote device via a communication network interface for processing display data for a display, cause the processor to:

determine display data for sending to the remote device for display;

determine processing resources to be used by the remote device to process the display data;

prepare the display data to be processed by the remote device using the determined processing resources;

send control information to the remote device instructing the remote device as to the processing resources to be used to process the prepared display data;

send the prepared display data to the remote device before, with or after the control information;

receive feedback from the remote device about regarding performance of the processing resources used for the processing of the prepared display data at the remote device; and repeat the determine processing resources, prepare the display data, send the control information and send the prepared display data based on the feedback.

26. A non-transitory tangible computer-readable medium carrying machine-readable instructions which, when executed by a processor at a remote device which is connectable to a host computing device via a communication network interface for displaying the display data, cause the processor to:

receive control information from the host computing device instructing the remote device as to processing resources to be used at the remote device to process the display data;

receive the display data before, with or after the control information;

set the processing resources at the remote device according to the received control information;

process the display data using the set processing resources to form displayable display data;

forwarding the displayable display data for display;

monitor performance of the processing resources during processing of the display data; and, send feedback to the host computing device regarding the processing performance.

* * * * *